US006295554B1

(12) United States Patent
Karadogan et al.

(10) Patent No.: US 6,295,554 B1
(45) Date of Patent: Sep. 25, 2001

(54) SYSTEM AND METHOD FOR COMMUNICATING WITH A TELCO-RETURN CABLE MODEM AS A SINGLE COMMUNICATIONS DEVICE (75) Inventors: Baris Karadogan, Chicago; Andrew Nunns, Naperville; Philip Thomas Robinson, Lake Barrington, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/085,651

(22) Filed: May 27, 1998

(51) Int. Cl.[7] ................................................. G06F 13/00

(52) U.S. Cl. .......................................................... 709/219

(58) Field of Search .................................... 709/219, 218, 709/220, 222, 225, 200, 217, 221; 713/201; 376/399

(56) References Cited

U.S. PATENT DOCUMENTS

| 5,014,234 | 5/1991 | Edwards, Jr. ........................ 364/900 |
| 5,138,712 | 8/1992 | Corbin ................................. 395/700 |
| 5,347,304 | 9/1994 | Moura et al. ......................... 348/12 |

(List continued on next page.)

OTHER PUBLICATIONS

"Cable Modem to Customer Premise Equipment Interface Specification (Interim) SP–CMCI–I02–980317", Multimedia Cable Network Systems (MCNS) Holdings, L.P., 1998, pp. ii to 40.
"Operations Support system Interface Specification Baseline Privacy Interface MIB (Interim) SP–OSSI–B-PI–I01–980331", MCNS Holdings, L.P., 1998, pp. ii–33.
"Cable Modem Termination System–Network Side Interface Specification (Interim Specification) SP–CMTS–N-SII01–960705", MCNS Holdings, L.P., 1996. ii–13.
"Removable Security Module Interface Specification (Interim Specification) SP–RSMI–I01–980204", MCNS Holdings, L.P., pp. ii–48.
"Baseline Privacy Interface Specification (itnerim) SP–BP–I01–970922", MCNS Holdings, L.P., 1997, pp. ii to 66.
"Operations Support System Interface Specification (Interim) SP–OSSII01–970403", MCNS Holdings, L.P., 1997, pp. 1–30.
"Radio Frequency Interface Specification (Interim Specification) SP–RFI–I02–971008", MCNS Holdings, L.P., 1997, pp. ii to 186.
"Cable Modem Telephony Return Interface Specification (Interim) SP–CMTRI–I01–970804", MCNS Holdings, L.P., 1997, pp. ii to 74.
"Security System Specification (Interim Specification) SP–SSI–I01–970506", MCNS Holdings, L.P., 1997, pp. ii to 103.
"Internet Engineering Task Force, Request for Comments 2131, Dynamic Host Configuration Protocol (DHCP)", Mar. 1997, pp. 1 to 42.
S. Adiraju, J. Fijolek, IPCDN Telephony Return MIB, Internet Engineering Task Force, "<draft–ietf–ipcdn–tri–mib–00.1.txt>," Mar. 23, 1998, pp. 1 to 26.

Primary Examiner—Robert B. Harrell
(74) Attorney, Agent, or Firm—McDonnell Boehnen Hulbert & Berghoff (57) ABSTRACT A system and method for communicating with a cable modem having an RF interface for downstream data and a PSTN interface for upstream data. The system uses a cable modem driver that receives commands for sending and receiving data. The cable modem driver interfaces to the RF interface to receive downstream data. The cable modem driver interfaces to an inner protocol driver to redirect data to a standard modem driver. The inner protocol driver sends the data to the modem driver and the modem driver sends the data over the PSTN connection.

28 Claims, 7 Drawing Sheets

U.S. PATENT DOCUMENTS

| | | | |
|---|---|---|---|
| 5,442,749 | 8/1995 | Northcut et al. | 395/200.098 |
| 5,488,412 | 1/1996 | Majeti et al. | 348/10 |
| 5,489,897 | 2/1996 | Inoue | 340/870.39 |
| 5,583,931 | 12/1996 | Schneider et al. | 379/399 |
| 5,586,121 | 12/1996 | Moura et al. | 370/404 |
| 5,600,717 | 2/1997 | Schneider et al. | 379/399 |
| 5,606,606 | 2/1997 | Schneider et al. | 379/399 |
| 5,608,446 | 3/1997 | Carr et al. | 348/6 |
| 5,623,542 | 4/1997 | Schneider et al. | 379/399 |
| 5,623,601 | 4/1997 | Vu | 395/187.01 |
| 5,636,211 | 6/1997 | Newlin et al. | 370/465 |
| 5,675,732 | 10/1997 | Majeti et al. | 395/200.01 |
| 5,710,855 | 1/1998 | Bondi | 709/224 |
| 5,761,602 | 6/1998 | Wagner et al. | 455/32.1 |
| 5,778,181 | 7/1998 | Hidary et al. | 395/200.48 |
| 5,790,198 | 8/1998 | Roop et al. | 348/460 |
| 5,790,548 | 8/1998 | Sistanizadeh et al. | 370/401 |
| 5,790,677 | 8/1998 | Hansen | 714/756 |
| 5,799,086 | 8/1998 | Sudia | 380/23 |
| 5,805,804 | 9/1998 | Laursen et al. | 348/7 |
| 5,808,655 | 10/1998 | Moura et al. | 370/326 |
| 5,812,819 | 9/1998 | Rodwin et al. | 395/500 |
| 5,818,845 | 10/1998 | Moura et al. | 370/449 |
| 5,835,727 | 11/1998 | Wong et al. | 395/200.68 |
| 5,852,721 * | 12/1998 | Dillon et al. | 709/217 |
| 5,854,901 | 12/1998 | Cole et al. | 709/25 |
| 5,859,852 | 1/1999 | Moura et al. | 370/449 |
| 5,864,679 | 1/1999 | Kanai et al. | 709/238 |
| 5,870,134 | 2/1999 | Laubach et al. | 348/12 |
| 5,872,523 | 2/1999 | Dellaverson et al. | 340/825.52 |
| 5,884,024 | 3/1999 | Lim et al. | 395/187.01 |
| 5,922,049 | 7/1998 | Radia et al. | 709/220 |
| 5,923,659 | 7/1999 | Curry et al. | 370/401 |
| 5,958,007 | 9/1999 | Lee et al. | 709/219 |
| 5,974,453 | 10/1999 | Andersen et al. | 709/220 |
| 5,996,076 | 11/1999 | Rowney et al. | 713/201 |
| 6,009,103 | 12/1999 | Woundy | 370/401 |
| 6,012,088 | 1/2000 | Li et al. | 709/219 |
| 6,013,107 | 1/2000 | Blackshear et al. | 703/229 |
| 6,018,767 | 1/2000 | Fijolek et al. | 709/218 |
| 6,049,826 | 4/2000 | Beser | 709/222 |
| 6,058,421 | 5/2000 | Fijolek et al. | 709/225 |
| 6,070,246 | 5/2000 | Beser | 713/201 |

* cited by examiner

```
VOID

SENDPACKETTOPPP(
     OUT PNDIS_STATUS    PSTATUS,
     IN PNDIS_PACKET     PACKET
     )                                      ← 140
(

NDISSEND(
OUT PNDIS_STATUS STATUS,
IN NDIS_HANDLE NDISBINDINGHANDLE,
IN PNDIS_PACKET PACKET
);

)
                                       100
```

```
BEGIN_VxD_SERVICE_TABLE(VUSRCABD)             ← 150

VxD_SERVICE(VUSRCABD_GET_VERSION)
    VxD_SERVICE(VUSRCABD_TRACE_MESSAGE)
    VxD_SERVICE(VUSRCABD_INDICATE_LOCKED)
    VxD_SERVICE(VUSRCABD_PUT_TCD)
    VxD_SERVICE(VUSRCABD_PUT_TSI)
    VxD_SERVICE(VUSRCABD_PUT_PRODUCT_INFO)
    VxD_SERVICE(VUSRCABD_PUT_SNMP_FUNCTION_ADDR)
    VxD_SERVICE(VUSRCABD_INCREMENT_PACKET_COUNT)
    VxD_SERVICE(VUSRCABD_INCREMENT_CRC_ERROR_COUNT)

VxD_SERVICE(VUSRCABD_PUT_STATISTIC)

VxD_SERVICE(VUSRCABD_PUT_SETFREQUENCY_FUNCTION_ADDR)
    VxD_SERVICE(VUSRCABD_PUT_SETIPADDRESS_FUNCTION_ADDR)
    VxD_SERVICE(VUSRCABD_GET_SAVED_VIP_BINDING_HANDLE)
    VxD_SERVICE(VUSRCABD_GET_INTERFACE_NUMBER)
    VxD_SERVICE(VUSRCABD_HOOK_MANAGER)

#IFDEF MANUFACTURING_BUILD
    VxD_SERVICE(VUSRCABD_PUT_MANUFACTURINGFUNCTION_ADDR)
#ENDIF
END_VxD_SERVICE_TABLE
```

FIG. 4C

```
BEGIN_SERVICE_TABLE CABLESHM

CABLESHM_SERVICE CABLESHM_GET_VERSION@0, VxD_LOCKED_CODE
CABLESHM_SERVICE CABLESHM_SEND_PACKET@8, VxD_LOCKED_CODE
CABLESHM_SERVICE CABLESHM_REGISTER_RECEIVE_HANDLER@4, VxD_LOCKED_CODE
CABLESHM_SERVICE CABLESHM_PUT_VIP_BINDING_HANDLE@4, VxD_LOCKED_CODE
CABLESHM_SERVICE CABLESHM_PUT_FILTER_INFO@4, VxD_LOCKED_CODE
END_SERVICE_TABLE CABLESHM
```

SYSTEM AND METHOD FOR COMMUNICATING WITH A TELCO-RETURN CABLE MODEM AS A SINGLE COMMUNICATIONS DEVICE

BACKGROUND OF THE INVENTION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

A. Field of the Invention

The present invention relates to cable modems and, more particularly, with communicating with a cable modem with telephony return.

B. Description of Related Art and Advantages of the Invention

The growth of the cable television (CATV) industry has provided an infrastructure of high frequency coaxial (HFC) cables connected to the homes of subscribers. This availability and the high bandwidth offered by HFC cables make the cable infrastructure a desirable medium for data networks. Cable modems permit users of data networks to exploit the high-speed capabilities of HFC cables using data over cable services.

Cable modems may be bi-directional or telephony return (Telco-return) cable modems. Bi-directional modems connect to HFC networks with the capability of sending and receiving data over the coaxial cable. Because CATV has been implemented as a, uni-directional communication system, bi-directional cable modems are not widely available. Telco-return cable modems use the uni-directional communication as a downstream (data sent to the subscriber) connection, but add a telephone (PSTN) connection as an upstream (data sent from the subscriber) connection.

Telco-return cable modems provide a downstream connection with data rates as high as 30 MHz, which is much higher than the data rates available over the PSTN upstream connection. Many applications make advantageous use of telco-return cable modems. For example, web browsers, such as Netscape™, involve high-volume data transfers from the web site to the user and a low-volume data transfer from the user to the web site. Moreover, telco-return cable modem connections may be implemented easily using the present CATV cable infrastructure.

One problem with the telco-rectum cable modem is that the use of two different interfaces (a coaxial cable interface and a telephone interface) complicates the development of drivers and other software components that use the cable modems. Facilities are available in operating systems to implement drivers according to device type. The facilities typically use the same type of device for sending and receiving data and implement only one driver for each device. In applications that communicate over the Internet, only one IP address is needed for each driver. Because Telco-return cable modems use two types of devices, applications may have to set up two different drivers for one cable modem connection. This increases the complexity of applications because it requires applications to maintain two drivers for each cable modem connection. In addition, it makes it difficult to a single IP address for one cable modem connection.

It would be desirable to communicate with the cable modem as one driver. It would be further desirable to have the same IP address in the upstream and downstream directions.

SUMMARY OF THE INVENTION

In view of the above, a system in a computer is provided for communicating with a cable modem having a radio frequency (RF) interface for receiving data and a public switched telephone network (PSTN) connection for sending data. The system includes a cable modem driver for receiving data from a computer application. The data received by the cable modem driver includes downstream data received from the RF interface and a upstream data for sending over said PSTN connection. A protocol driver is included for connecting the computer application to the cable modem driver. The protocol driver sends upstream and downstream data to the cable modem driver. A modem driver sends upstream data via the PSTN connection.

An inner protocol driver is connected to the cable modem driver. The inner protocol driver receives upstream data from the cable modem driver. The inner protocol driver is connected to the modem driver for sending the upstream data to the modem driver.

In another aspect of the present invention, a method is provided for sending and receiving data over a cable modem having a radio frequency (RF) interface for receiving data and a public switched telephone network connection for transmitting data. The method includes the step of initializing a modem driver for communicating send commands to the PSTN connection. Upstream data is sent for transmission to the cable modem driver. The cable modem driver sends the upstream data to an inner protocol driver. The inner protocol driver sends the upstream data to the modem driver.

In another aspect of the present invention, a method is included for providing a program interface to a cable modem with telephony return. A protocol driver is provided for connecting an application to a network and a standard modem service for connecting the protocol driver to a public-switched telephone network (PSTN) interface. A modem driver is configured using the standard modem service. A cable modem driver is provided for communicating with a radio frequency interface for receiving downstream data from a high frequency coaxial cable (HFC) and for receiving upstream from the application. An inner protocol driver is provided for receiving upstream data from the cable modem driver and for sending the upstream data to the modem driver.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

Figure 1:
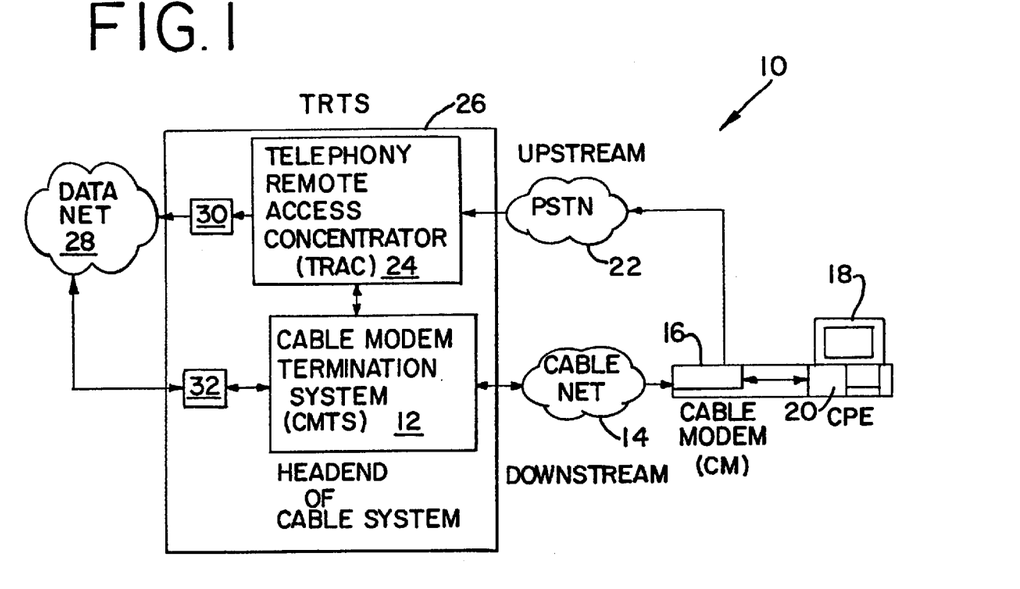
FIG. 1 is a block diagram illustrating a cable modem system with telephony return of the type in which the present invention finds particular use.

FIG. 1 is a block diagram illustrating a data-over-cable system with telephony return 10, hereinafter data-over-cable system 10. Most cable providers known in the art predominately provide uni-directional cable systems, supporting only a "downstream" data path. A downstream data path is the flow of data from a cable television network headend to customer premise equipment (e.g., a customer's personal computer). A return path via a telephony network ("telephony return") is typically used for an "upstream" data path in uni-directional cable systems. An upstream data path is the flow of data from customer premise equipment back to the cable television network headend.

Data-over-cable system 10 includes a Cable Modem Termination System ("CMTS") 12 connected to a cable television network 14, hereinafter cable network 14. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a cable modem ("CM") 16 with a downstream connection. The CM 16 is connected to Customer Premise Equipment ("CPE") 18 such as a personal computer system via a Cable Modem-to-CPE Interface ("CMCI") 20 on CPE 18. The CM 16 is connected to a Public Switched Telephone Network ("PSTN") 22 with an upstream connection. PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group) and others. PSTN 22 is connected to a Telephony Remote Access Concentrator ("TRAC") 24.

The CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by the dashed box in FIG. 1. CMTS 12 and TRAC 24 make up TRTS 26 whether or not they are located at the headend of cable network 14, and TRAC 24 may in located in a different geographic location from CMTS 12. Content severs, operations servers, administrative servers and maintenance servers used in data-over-cable system 10 (not shown in FIG. 1) may also be provided in different locations. Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

TRAC 24 is connected to data network 28 by a TRAC-Network System Interface 30 ("TRAC-NSI"). CMTS 12 is connected to data network 28 by a CMTS-Network System Interface ("CMTS-NSI") 32. The present invention is not limited to the dataover-cable system 10 such as illustrated in FIG. 1, and more or fewer components, connections and interfaces could also be used.

FIG. 1 illustrates a telephony return cable modem 16 implemented as an internal modem in the CPE 20. Alternatively, the telco-return cable modem 16 may be implemented as an external modem that may have a telephony modem integral to the cable modem 16 or a separately connected telephony modem for connecting to the PSTN 22. The separate telephony modem includes a connection to CM 16 for exchanging data. CM 16 includes cable modems provided by the 3Com Corporation of Santa Clara, Calif., U.S. Robotics Corporation of Skokie, Ill., and others.

The system in FIG. 1 may be used to connect the CPE 18 to any type of data network 28 for any type of application. A system for using the cable modem 16 to communicate with the data network 28 is described below. The description below uses a web browser as an application, however, any type of application may be used with embodiments of the present invention.

In addition, the CPE 18 in the examples described below uses the Windows NT, Windows 95 or later versions of Windows as an operating system. It is to be understood that any operating system may be used in the CPE 18, however, an operating system having architecture for interfacing to communications devices is preferred. Such architecture advantageously standardizes communications interfaces and reduces the development time of applications that use the communications interfaces. An example of how the cable modem 16 interfaces with an application, such as a Web browser using a standardized communications interface is illustrated by the block diagram in FIG. 2.

Figure 2:
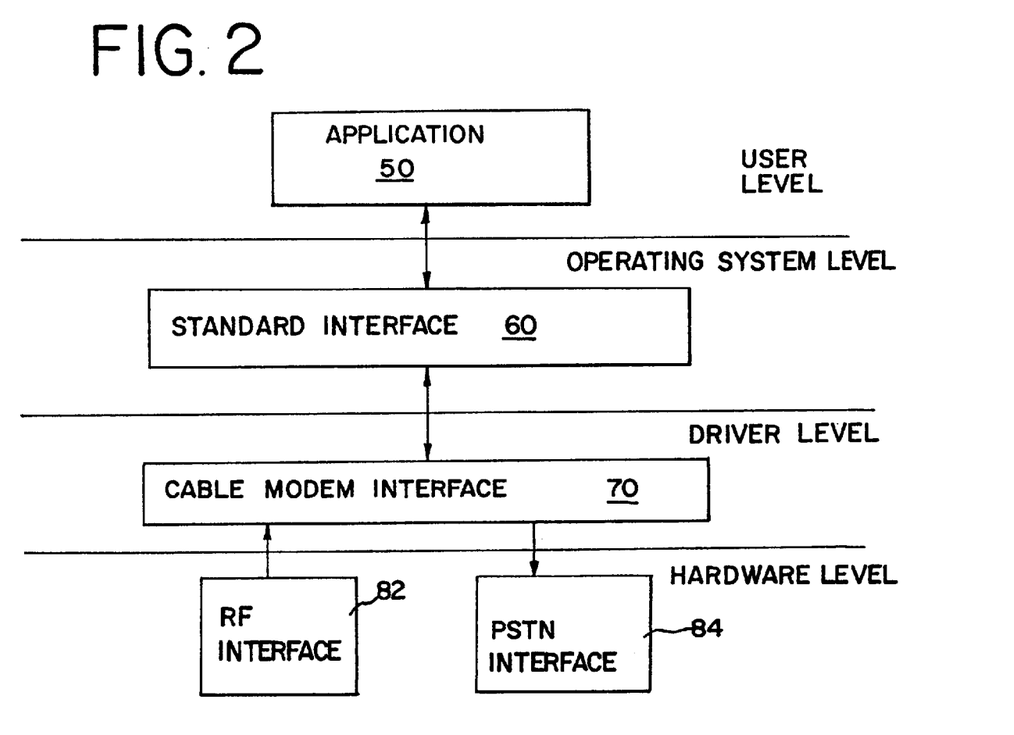
FIG. 2 is a block diagram of a system for communicating with the cable modem with telephony return shown in FIG. 1 according to a preferred embodiment of the present invention.

The diagram of FIG. 2 shows software structure in CPE 18 in which an application 50 uses the standard interface 60 to communicate with a cable modem interface 70. The cable modem interface 70 includes commands, function calls, data structures or other programming mechanisms for sending data over the PSTN connection 84 and for receiving data over an RF interface 82. The software structure elements are implemented in different levels of resources in a typical CPE 18. The levels include the user level, the operating system level, the driver level and the hardware level. These levels are broadly defined to reflect a hierarchy of resources in which applications 50 in typical CPEs 18 operate. One of ordinary skill in the art will understand that the levels described below are neither all-inclusive nor limited to any particular CPE 18. Moreover, one of ordinary skill in the art will understand that the levels described below may refer to parts of a system as a hierarchy of layers as opposed to actual software and hardware components.

FIG. 2 shows the levels in which each element is implemented. The application 50 is implemented, along with other applications in the CPE 18, in the user level. The user level in the CPE 18 includes resources that are used by the users of the CPE 18. For example, the user level includes applications such as word processors, spreadsheet programs, web browsers, etc.

The standard interface 60 is in the operating system level, which may include any resource that application programs may use to perform user level functions. In general, operating systems provide applications 50 with memory, input/output and other resources. The standard interface 60 includes tools, utilities and architecture for permitting the application 50 to access the communications resources available in the CPE 18. The standard interface 60 is typically a part of the operating system, although it may be added on as a set of programmer tools that software developers may use during development of the application 50 to provide access to operating system resources.

The advantage of providing a standard interface 60 in CPEs 18 is that it provides programmers with a standard way of using the resources in the CPE 18. Different programmers may develop different applications in the same type of CPE 18. All programmers use the same set of rules to access the same resources. This simplifies the development of applications 50 because developers may access functions on a higher level. For example, if the application 50 is a web browser, the standard interface 60 permits the programmer to implement software components that access the Internet by directing data to network control software. The standard interface may provide communications commands, data structures, function calls or other programming mechanisms for directing the data to the network control software. The application 50 does not need commands or instructions that address a specific driver and the application 50 does not need to know what type of hardware is being used to access the Internet.

The cable modem interface 70 is in the driver level, which includes direct interfaces to the hardware that implements input/output functions. Software that controls the hardware preferably complies with MCNS standards. An operating system typically includes guidelines, or even an interface system that permits programmers to provide a standard form for drivers on the driver level. The advantage of using such guidelines is that it simplifies the development of applications 50 by reducing the tasks required of the application 50 to use a driver.

The RF interface 82 and PSTN interface 84 are the hardware components that receive or send signals over the appropriate medium to and from the data network 28. The RF interface 82 provides the downstream (to CPE 18) connection and the PSTN interface 84 provides the upstream (from CPE 18) connection.

In a preferred embodiment of the present invention, the RF interface 82 has an operational frequency range of 72 MHz to 1 GHz, and a channel bandwidth of 6 MHz. RF interface 82 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 82. However, other operating frequency modulation methods could also be used. For more information on RF interface 82 see the Institute of Electrical and Electronic Engineers ("IEEE") standard 802.14 for cable modems incorporated herein by reference.

As shown in FIG. 1, the CM 16 includes the PSTN interface 84 in the hardware layer for upstream data transmission with telephony return. The International Telecommunications Union-Telecommunication Standardization Sector ("ITU-T", formerly known as the CCITT) defines standards for communication devices identified by "V.xx" series where "xx" is an identifying number.

In one embodiment of the present invention, ITU-T V.34 is used as modem interface 48. As is known in the art, ITU-T V.34 allows data rates as high as 33,600 bits-per-second ("bps"), however, other modem interfaces could also be used (e.g., V.42 and others).

The Windows operating system is one example of an operating system that provides a standard interface to allow programmers to develop applications that communicate with networks.

At the time the system is booted, protocol drivers bind to NIC drivers. Applications access protocol drivers using the transport driver interface (TDI), or a Windows Socket. The TDI is a standard interface for protocol drivers.

Windows includes network software development tools in a Windows Network Architecture that allow programmers to develop applications that communicate over networks without having to program many of the software components that carry out network communications tasks. The Windows Network Architecture includes interfaces to protocol drivers, or programs that implement standard communications protocols used to transport data over networks. The protocol drivers interface to drivers, or software that controls the hardware.

Also included are standard drivers for commonly used hardware components, such as PSTN-connected modems at the PSTN interface 84. One such driver is the Dial-up Networking Adapter which provides a driver for PSTN-connected modems using the Point-to-Point Protocol (PPP).

Using the Windows Network Architecture, application software developers may only need to develop software at the user level and at the driver level. Drivers may be developed for communications devices (such as PSTN-connected modems at the PSTN interface 84 and the device connected at the RF interface 82) and given an interface that is known to network protocol programs that use the drivers. Such drivers are called network interface card (NIC) drivers because the drivers are typically used as connections to a network. NIC drivers are typically used by protocol programs, or protocol drivers. In general, protocol drivers implement protocols such as TCP/IP or IPX/SPX.

The Network Architecture includes a standard interface called the Network Driver Interface Specification (NDIS) for developing NIC drivers. NDIS provides functions and resources for making driver interfaces available to protocol drivers bound to them. Protocol drivers use NDIS library to use NDIS functions to access NIC drivers.

NIC drivers may be developed as miniport NIC drivers or as full port NIC drivers. Miniport drivers perform hardware-specific operations for managing a NIC, such as sending and receiving data through a hardware port. Other functions, such as synchronization and queuing operations are performed by the operating system using NDIS function calls. In addition, miniport NIC drivers do not keep track of binding information. When miniport NIC drivers pass data to and from a protocol driver, the data is passed up to NDIS functions which ensure that the data is passed to the proper protocol. Full port drivers perform hardware-specific functions as well as synchronization and queuing operations. Full NIC drivers also keep track of binding information for indicating received data.

The Windows NT operating system provides built-in NIC driver for commonly used hardware components. One such built-in NIC driver is the Dial Up Networking Adapter, or the modem driver, that interfaces to traditional PSTN-connected modems. The modem driver makes a modem look like a network card, or like a NIC, to protocol drivers.

Typical protocol drivers, however, assume that communications channels use a single device for sending and receiving data. The telco-return cable modem uses different devices for sending and receiving data making it difficult to use one channel for sending and receiving data.

Figure 3:
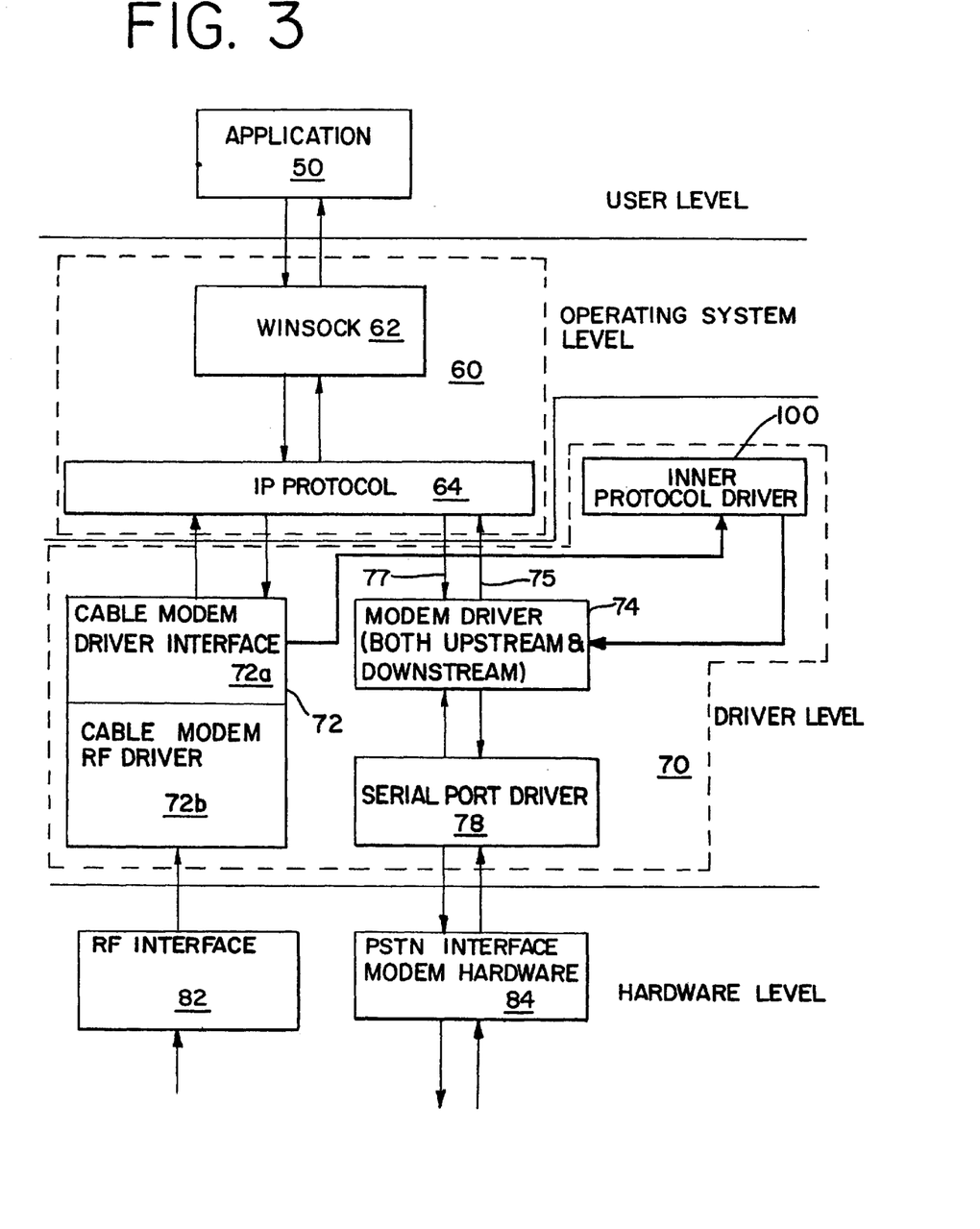
FIG. 3 is a block diagram of one example of software structure that may be used in the system in FIG. 2 in a preferred embodiment.

FIG. 3 is a block diagram of a software structure in the CPE 20 for communicating with a network, such as the data network 28, using the cable modem 16. The system in FIG. 3 includes an application 50 at the user level; and a windows socket (WINSOCK) 62, and a network protocol driver 64, which in a preferred embodiment is an IP protocol, at the operating system level. At the driver level, the diagram in FIG. 3 shows a cable modem driver 72, a modem driver 74, a cable modem 76 and a serial port driver 78. In addition, an inner protocol driver 100 is included at the driver level to redirect upstream data to the modem driver. At the hardware level, FIG. 3 shows a RF interface 82, and a PSTN interface 84.

The application 50 may include any application that may connect to the data network 28. For example, the data network 28 may include a WAN such as the Internet and the application may include a web browser for interfacing with the World Wide Web.

The application 50 interfaces to the IP protocol 64 using the Winsock 62 interface. The Winsock 52 is an application programming interface (API) that is used in Windows to call services that transport data across a network. The Winsock 62 is a standard API between the Microsoft Windows application 50 and TCP/IP protocol software, or a protocol stack. The Winsock 62 may include Winsock version 1.1 or Winsock version 2.0. Alternatively, the TDI interface may be used instead of the Winsock.

The cable modem driver 72 includes a cable modem driver interface 72*a* and the cable modem RF driver 72*b*. The cable modem driver interface 72*a* provides function calls, data structures, or other programming mechanisms for accessing the cable modem RF driver 72*b*. In a preferred embodiment, the cable modem driver interface 72*a* is implemented using the NDIS. The IP protocol 64 binds to the cable modem driver 72 at system bootup and routes input and output to the data network 28 using calls to the cable modem driver interface 72*a*. The cable modem RF driver 72*b* receives data from the HFC coaxial cable at the RF interface 82. The cable modem driver interface 72*a* uses the inner protocol driver 100 to issue send data commands to the modem driver 74. The modem driver 74 sends the data up stream through the serial port driver 78 at the PSTN interface 84.

The IP protocol 64 is a protocol driver that implements a selected protocol for transporting data across a selected network. In a preferred embodiment, the selected network is the Internet, and the protocol driver implements the Internet Protocol, or IP protocol 64. The IP protocol 64 maintains IP addresses for devices used to transport data over the Internet. In the preferred embodiment, only one IP address is used for the RF interface 82 and the PSTN connection 84 used with the cable modem driver 72.

The cable modem RF driver 72*b* is a miniport NIC driver that is bound to the IP protocol 64 at system boot-up to provide bi-directional communication. In a telco-return system, however, the cable modem 16 uses the RF interface 82 in the downstream direction only. When the cable modem driver interface 72*a* receives send commands for sending data upstream, the data is routed to the modem driver 74 using the inner protocol driver 100. The cable modem driver interface 72*a* preferably uses the NDIS to send and receive data. When the cable modem driver 72 is initialized at boot-up time, a handle, or identifier, is created for use by the cable modem driver interface 72*a* as identification to the IP protocol 64.

The modem driver 74 is preferably a typical bi-directional modem connection to the PSTN interface 84 that implements the Point-to-Point Protocol (PPP). In the Windows environment, the modem driver 74 is implemented as the Dial-Up Networking Adapter. The Dial-Up Networking Adapter is initialized having the ability to send and receive data between it and the IP protocol 64 using send path 75 and a receive path 77. These data paths 75, 77 are not however used for the upstream data path of the cable modem 16 in a preferred embodiment. The cable modem driver 72 routes data packets that are to be sent over the Internet via the modem driver 74 thereby advantageously precluding the need for providing a special serial driver in the upstream direction. The modem driver connects to the serial port driver 78 that controls the PSTN interface 84 to carry out the transmission of data in the upstream direction.

In the preferred embodiment, the inner protocol driver 100 redirects send data commands sent by the IP protocol 64 to the cable modem driver interface 72*a* to the modem driver 74. In addition, the modem driver 74 receives a handle, or driver identifier, when the IP protocol 64 binds to the modem driver 72 at system boot-up. The handle is used by the modem driver 74 to ensure that any data that is to be sent over the PSTN connection 84 was provided by the IP protocol 64. During initialization of the cable modem driver 72, the handle for the modem driver 74 is communicated to the cable modem driver interface 72*a*. The cable modem driver interface 72*a* provides the handle to the inner protocol driver 100. The inner protocol driver 100 uses the handle to communicate data to be sent upstream to the modem driver 74. The inner protocol driver 100 is preferably implemented using the Windows Virtual Driver (VxD) resources which permit its function calls to be exported using a service table that is described in more detail below with reference to FIG. 3.

One advantage of the structure in FIG. 3 is that a single interface is used for communicating with the cable modem driver 72 in a Windows environment. In addition, the single interface is created without the need for a special modem driver. The single interface may use the modem driver 74 created by the Dial-Up Networking Adapter as the PSTN connected upstream connection.

Figure 4A:
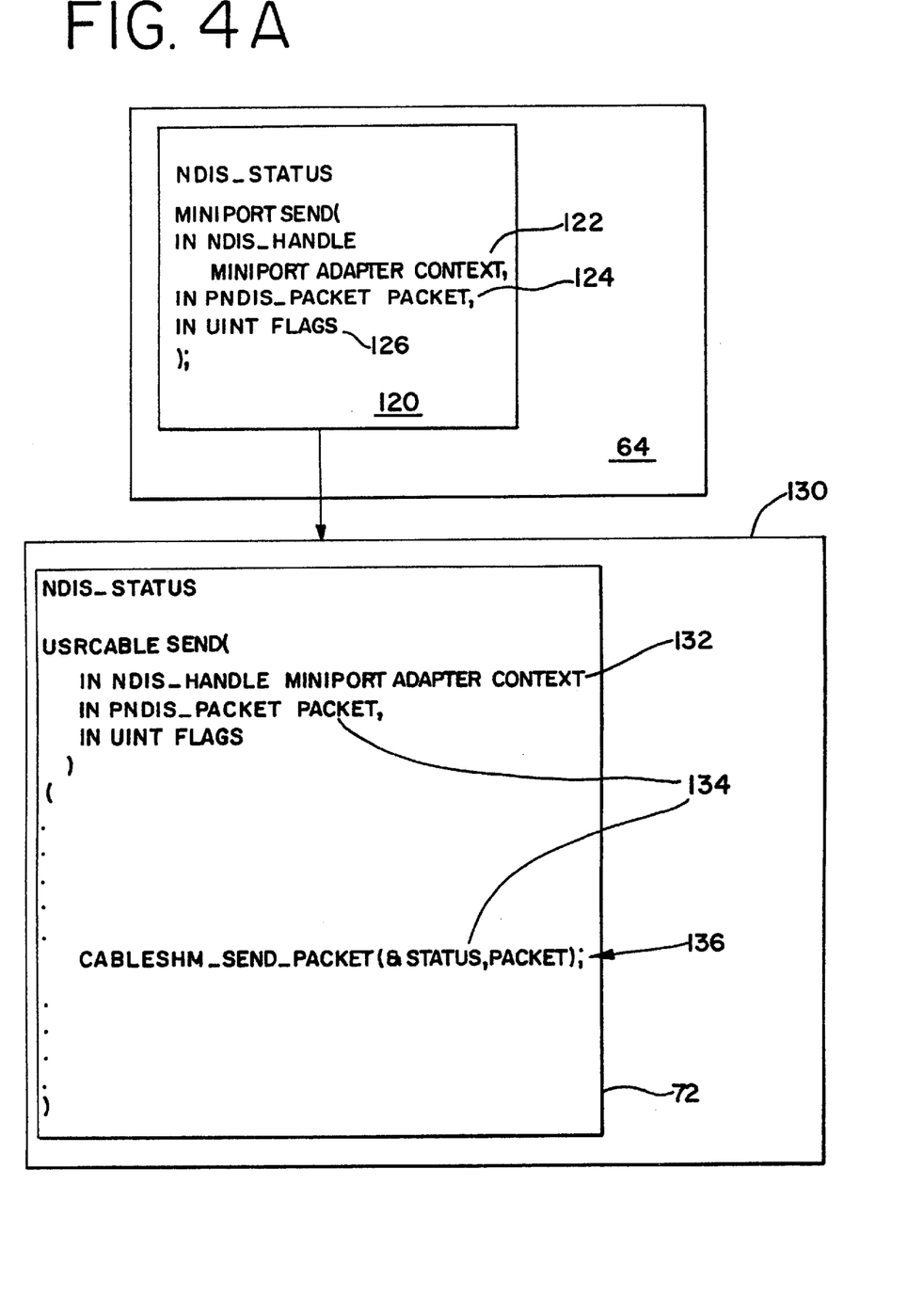
FIGS. 4A, 4B, and 4C are source codes for functions for sending a packet of data using the system of FIG. 3.

FIGS. 4A, 4B, and 4C show examples of source code for using a single cable modem interface 70 (in FIG. 2) as an upstream and a downstream connection. In a preferred embodiment, the cable modem driver 72 is bound to the IP protocol 64 using the Windows NDIS interface. FIG. 4A shows an example of a miniportsend command 120 that the IP protocol 64 may use when it has data to send upstream. The miniportsend command 120 is a standard NDIS send command for a miniport driver that includes the handle 122 for the cable modem driver 72, the data packet 124 that is to be sent upstream and a flag parameter 126 for packet flags from the IP protocol 64.

At system boot-up, one of the initialization tasks of the NDIS is to identify a CM send function 130 as the function that is to be called when the miniportsend command 120 is executed. The CM send function 130, shown in FIG. 4A, includes an inner protocol driver send command 136, which in a preferred embodiment is called CABLESHM_Send_Packet. The inner protocol driver send command 136 includes the packet of data 134 and a pointer for a status indication. When the miniportsend command 120 is invoked from the protocol 64, the NDIS calls the CM send function 130. The CM send function 130 calls the inner protocol driver send command 136.

Figure 4B:
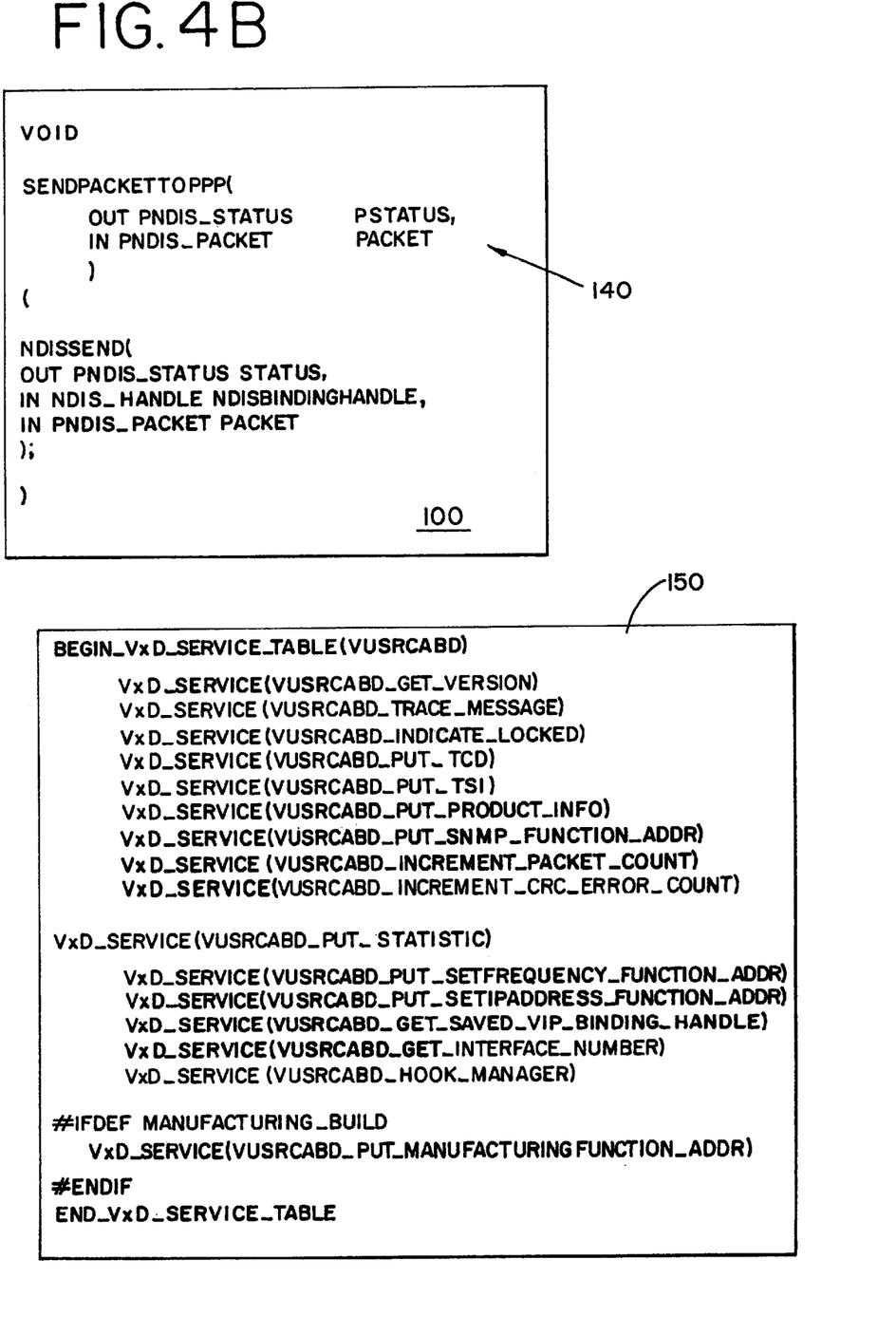

In the inner protocol driver 100, the inner protocol driver send command 136 calls SendPacketToPPP 140, for sending packets via the modem driver 74 shown in FIG. 4B. The inner protocol driver 100 uses the NDIS_BindingHandle to identify the modem driver 74 as the proper recipient of the data packet that is to be sent upstream. The NDIS_BindingHandle is made available to the inner protocol driver 100 when it binds to the modem driver 72 during system boot-up. The NDIS_BindingHandle is generated when the IP protocol 64 initializes the modem driver 74 using the Dial-Up Adapter. One advantage of using the inner protocol driver 100 and the modem driver 72 is that the standard interface of the Windows operating system provided much of the software for communicating in the upstream direction.

Figure 4C:
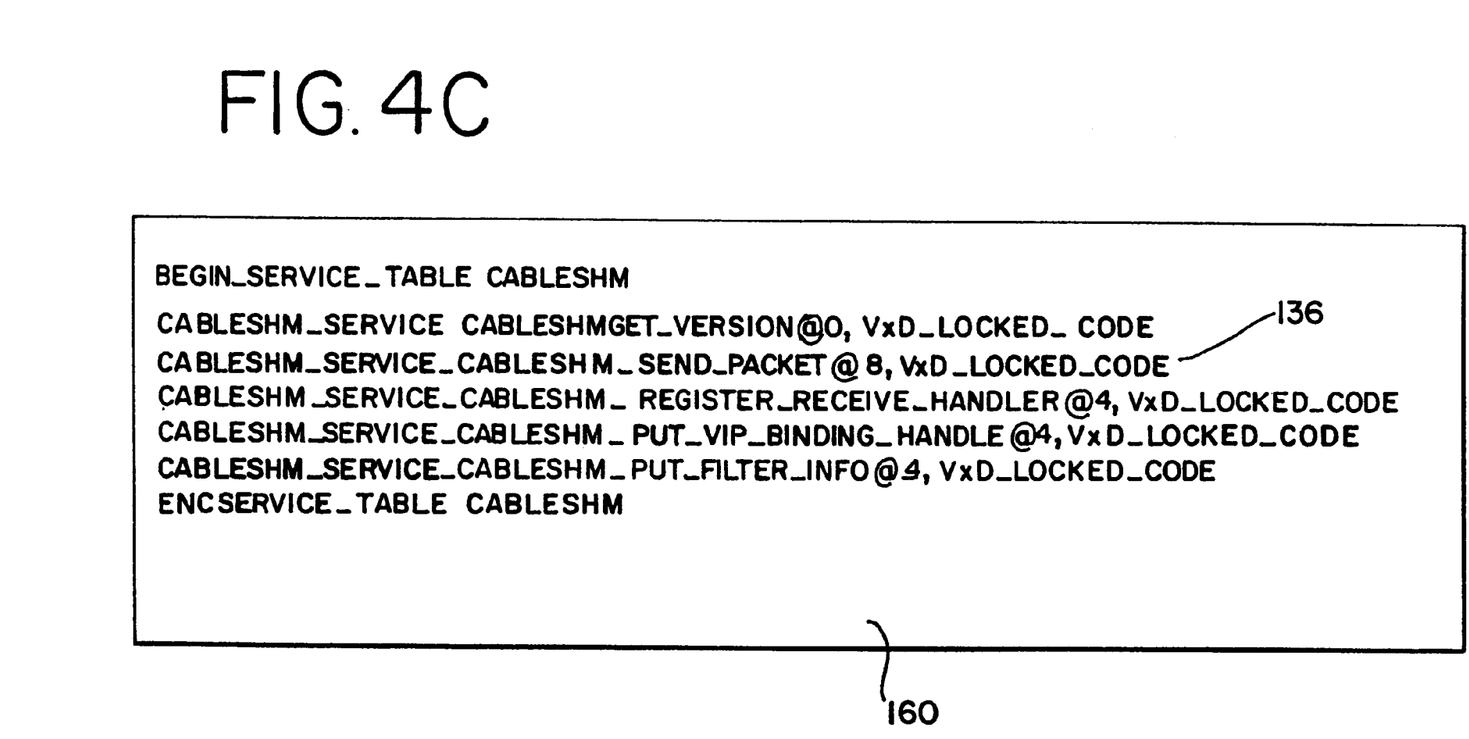

In a preferred embodiment, the inner protocol driver 100 is implemented using the Windows VxD resources. The VxD resources provide a way for making the interface to the inner protocol driver 100 available for use by other programs, such as the cable modem driver 72. The VxD is also used to make the cable modem driver 72 information available to the Small Network Management Protocol (SNMP). The VxD makes information for a resource available to other programs using a service table that is defined by a programmer during development. A cable modem service table 150 is shown in FIG. 4B. The CM service table 150 may be used to obtain information from the cable modem that other programs (such as the SNMP) may use for management purposes. An upstream cable modem service table 160 is shown in FIG. 4C. The upstream cable modem service table 160 includes the function call 136 used in the CM send function 130 shown in FIG. 4A and a binding information function call 166 for receiving the binding information used to send data to the modem driver 74.

Alternatively, the inner protocol driver 100 and the cable modem driver 72 may also pass information with other applications (such as the SNMP) using the DeviceIoControl resources available in Windows NT and Windows 95 or later.

Figure 5:
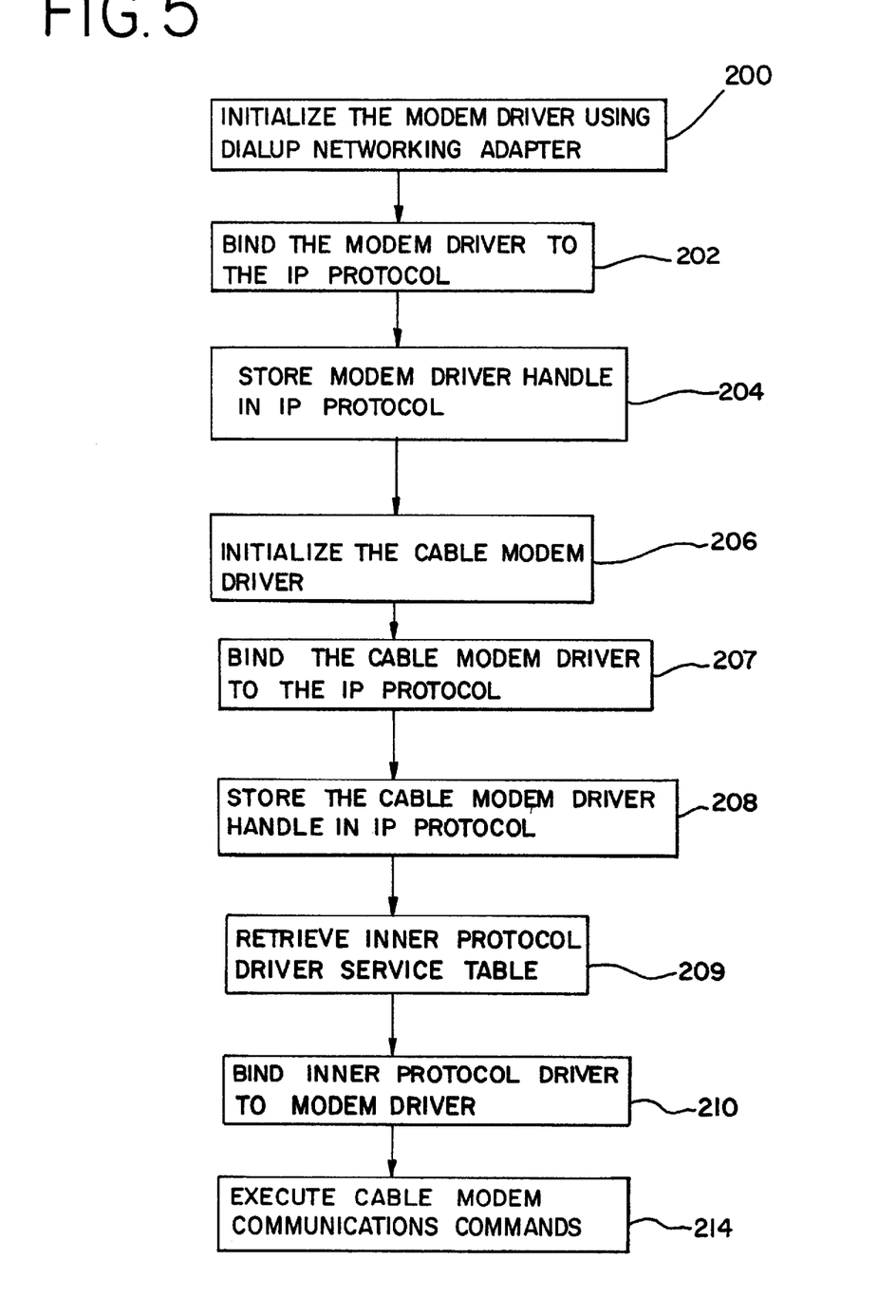
FIG. 5 is a flowchart for initializing the cable modem in FIG. 2.
Figure 6:
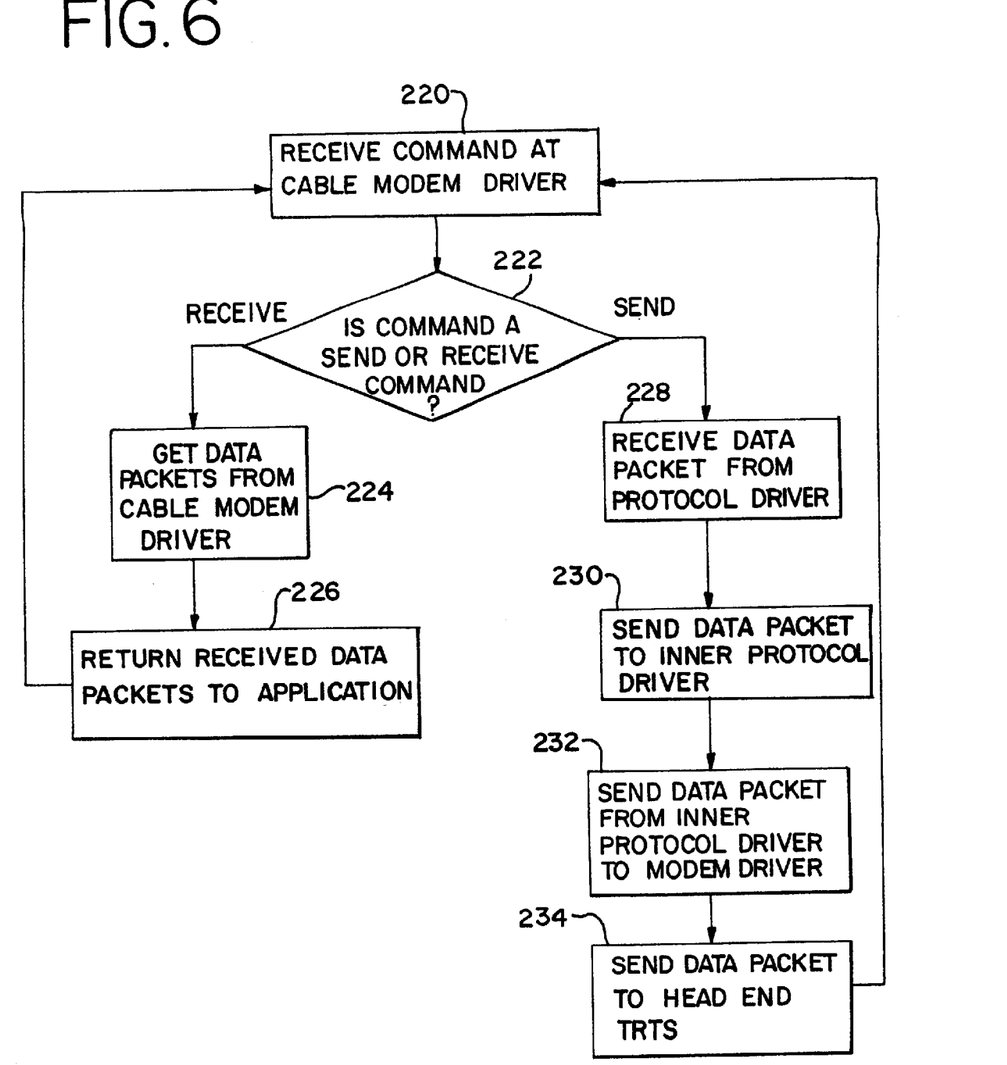
FIG. 6 is a flowchart for a method for communicating with the cable modem with telephony return.

FIGS. 5 and 6 show flowcharts of methods for communicating over a network using a telco-return cable modem according to a preferred embodiment. In a preferred embodiment, the methods in FIGS. 5 and 6 are performed using the software structure shown in FIG. 3.

FIG. 5 is a flowchart of a process for initializing the software structure for communicating with a cable modem. In step 200, the modem driver 74 is initialized using the Dial-Up Networking Adapter. One advantage of the present invention is that the cable modem implementation makes use of the resources provided by the operating system. In a preferred embodiment, the resources of the Windows Network Architecture are advantageously used to perform functions that would otherwise be developed.

At step 202, the IP protocol 64 binds to the modem driver 74. The IP protocol receives information from the modem driver that permits the IP protocol to communicate over the PSTN connection associated with the modem driver 64. The information includes binding information, or a driver handle that the modem driver sends to the IP protocol whenever there is a data transfer between the PSTN connection and the modem driver 74. At step 204, the handle is stored in memory by the IP protocol.

The cable modem driver 72 is initialized at step 206. During initialization of the cable modem driver 72 all hardware reset functions and synchronization functions are performed. At step 207, the IP protocol 64 binds to the cable modem driver 72. The IP protocol 64 stores the handle to the cable modem driver 72 for later access to the cable modem services at step 208.

The cable modem driver 72 retrieves the inner protocol driver 100 VxD service table, an example of which is shown in FIG. 4C. The service table permits the cable modem driver 72 to determine the manner in which it is to make function calls to the inner protocol driver 100 when it has data packets to transmit upstream.

At step 210, the inner protocol driver 100 binds to the modem driver 74 for later access to the modem driver 74 when the cable modem driver 72 has data to transmit upstream. At step 214, the cable modem driver 72 may execute cable modem communications commands.

FIG. 6 shows a flowchart of a preferred method for communicating using the single interface to the cable modem driver 72 (in FIG. 3). The cable modem driver 72 may receive commands to receive data packets that have been sent downstream from the headend (see FIG. 1). The cable modem driver 72 may also receive commands to send data packets upstream over the PSTN interface 84 (in FIG. 3). The advantage of the method in FIG. 6 is that the same interface is used to perform both commands. Moreover, advantageous use is made of resources built-in to the operating system and no specially developed software is required to implement the method.

At step 220, a command is received at the cable modem driver 72. At decision block 222, the command is checked to determine if it is a send or receive command. If it is a receive command, then the calling program is requesting the data packets that have been received over the downstream connection at the RF interface 82. At step 224, the data packets are retrieved from the RF interface 82. Typically, data packets arrive at the RF interface 82 one packet at a time and generate an interrupt as they arrive. The data packets may be received using interrupt service routines and parsed before being sent to the application 50 at step 226.

If the cable modem receives a send command, such as a miniportsend command 120 in FIG. 4A, the data packet is received from the IP protocol 64 at step 228. The cable modem driver 72 calls an inner protocol driver command according to the inner protocol driver service table 160 in FIG. 4C at step 230 to send the data packet to the inner protocol driver 100. At step 232, the inner protocol driver 100 (in FIG. 3) sends the data to the modem driver 74 (in FIG. 3) using the PPP send command 140 in FIG. 4B. The modem driver 72 sends the data packet over the PSTN to the head end at step 234.

While the invention has been described in conjunction with presently preferred embodiments of the invention, persons of skill in the art will appreciate that variations may be made without departure from the scope and spirit of the invention. For example, the use of the protocols, tools, operating systems and standards referenced above is merely by way of example. Any suitable protocol, tool, operating system or standard may be used in preferred embodiments of the present invention. This true scope and spirit is defined by the appended claims, interpreted in light of the foregoing.

We claim:

1. A method of providing a program interface to a cable modem with telephony return in a computer comprising a user level, an operating system level comprising a standard interface for communicating with the RF interface and the PSTN interface, and a driver level for communicating hardware that implements the RF interface and the PSTN interface, comprising the steps of:

providing a protocol driver for connecting an application to a network and a standard modem service for connecting the protocol driver to a public-switched telephone network (PSTN) interface;

configuring a PSTN-connected modem driver using the standard modem;

providing a cable modem driver for communicating with a radio frequency interface for receiving downstream data from a high frequency coaxial cable (HFC) and for receiving upstream data from the application; and providing an inner protocol driver at the driver level for receiving upstream data from the cable modem driver and for sending the upstream data to the PSTN-connected modem driver.

2. The method of claim 1 further comprising the step of:

providing an initialization program for initializing the program interface to the cable telephony return modem by the steps of:

binding the protocol driver to the PSTN-connected modem driver;

binding the protocol driver to the cable modem driver; and binding the inner protocol driver to the PSTN-connected modem driver.

3. The method of claim 2 wherein the step of binding the inner protocol driver to the modem driver includes the step of receiving a handle from the modem driver.

4. The method of claim 1 wherein the step of providing the inner protocol driver includes the step of implementing the inner protocol driver as a Windows Virtual Driver (VxD).

5. The method of claim 4 wherein the step of providing the inner protocol driver includes the step of creating a VxD setup table.

6. The method of claim 1 wherein the step of providing the protocol driver includes the step of providing an Internet Protocol.

7. The method of claim 1 wherein the step of providing the protocol driver and standard modem service includes the step of providing a Windows Dialup Networking Adapter.

8. The method of claim 1 further comprising the step of setting up the modem driver to perform a Point-to-Point Protocol (PPP).

9. The method of claim 1 wherein the step of providing the cable modem driver includes the step of implementing the cable modem driver according to the Windows Network Driver Interface Specification.

10. A system in a computer for communicating with a cable modem having a radio frequency (RF) interface for receiving downstream data and a public switched telephone network (PSTN) interface for sending upstream data, the system comprising, in combination:

the computer comprising a user level, an operating system level comprising a standard interface for communicating with the RF interface and the PSTN interface, and a driver level for communicating hardware that implements the RF interface and the PSTN interface;

a cable modem driver in the driver level, the cable modem driver comprising a cable modem driver interface for receiving downstream data from the RF interface and for sending upstream data over said PSTN connection, the cable modem interface using the standard interface;

a protocol driver for connecting a computer application to said cable modem driver, said protocol driver being operable to communicate with said cable modem driver interface;

a PSTN-connected modem driver for sending upstream data via said PSTN interface, the PSTN-connected modem driver using the standard interface; and an inner protocol driver connected to said cable modem driver for receiving upstream data from said cable modem driver, said inner protocol driver being connected to said PSTN-connected modem driver for sending the upstream data to said PSTN-connected modem driver, the inner protocol driver operating in the driver level.

11. The system of claim 10 wherein said protocol driver implements a wide area network protocol.

12. The system of claim 11 wherein said wide area network protocol is an IP protocol.

13. The system of claim 11 wherein said wide area network protocol is a UDP protocol.

14. The system of claim 10 wherein said cable modem driver includes a wide area network address for sending and receiving data.

15. The system of claim 10 wherein said PSTN-connected modem driver uses a dial up networking adapter as the standard interface in a Windows operating system environment.

16. The system of claim 10 wherein said inner protocol driver is a virtual device driver in a Windows operating system environment.

17. A system in a computer for communicating with a cable modem having a radio frequency (RF) interface for receiving downstream data and a public switched telephone network (PSTN) interface for sending upstream data, the system comprising, in combination:

a cable modem driver comprising a cable modem driver interface for receiving downstream data from the RF interface and for sending upstream data over said PSTN connection;

a protocol driver for connecting a computer application to said cable modem driver, said protocol driver being operable to communicate with said cable modem driver interface;

a single network address operable to identify the computer as a destination for data communicated downstream to the RF interface and as a source for data communicated upstream from the PSTN interface;

a PSTN-connected modem driver for sending upstream data via said PSTN interface; and an inner protocol driver connected to said cable modem driver for receiving upstream data from said cable modem driver, said inner protocol driver being connected to said PSTN-connected modem driver for sending the upstream data to said PSTN-connected modem driver.

18. The system of claim 17 wherein said protocol driver implements a wide area network protocol.

19. The system of claim 18 wherein said wide area network protocol is an IP protocol.

20. The system of claim 17 wherein said PSTN-connected modem driver uses a dial up networking adapter as the standard interface in a Windows operating system environment.

21. The system of claim 17 wherein said inner protocol driver is a virtual device driver in a Windows operating system environment.

22. In a system using a cable modem having a radio frequency (RF) interface for receiving downstream data and a public switched telephone network connection for transmitting upstream data, a method for sending upstream data and receiving downstream data over the cable modem, the computer comprising a user level, an operating system level comprising a standard interface for communicating with the RF interface and the PSTN interface, and a driver level for communicating hardware that implements the RF interface and the PSTN interface, the method comprising the steps of:

initializing a PSTN-connected modem driver for communicating upstream data to the PSTN connection;

initializing a cable modem driver for communicating downstream data received from a data network;

sending upstream data for transmission to said cable modem driver;

said cable modem driver sending said upstream data in the driver level to an inner protocol driver; and said inner protocol driver sending in the driver level said upstream data to said PSTN-connected modem driver.

23. The method of claim 22 further comprising, before the step of sending said data for transmission, the step of binding said cable modem driver to a wide area network protocol driver.

24. The method of claim 22 further comprising, before the step of sending said data for transmission, the step of binding said PSTN-connected modem driver to a wide area network protocol driver.

25. The method of claim 22 further comprising, before the step of sending said upstream data for transmission, the step of initializing said cable modem driver with a single wide area network address for communicating data via said RF interface and said PSTN connection.

26. In a system using a cable modem having a radio frequency (RF) interface for receiving downstream data and a public switched telephone network connection for transmitting upstream data, a method for sending upstream data and receiving downstream data over the cable modem, the method comprising the steps of:

initializing a PSTN-connected modem driver for communicating upstream data to the PSTN connection;

initializing a cable modem driver for communicating downstream data received from a data network;

initializing said cable modem driver with a single wide area network address for communicating data via said RF interface and said PSTN connection sending upstream data for transmission to said cable modem driver;

said cable modem driver sending said upstream data in the driver level to an inner protocol driver; and said inner protocol driver sending in the driver level said upstream data to said PSTN-connected modem driver.

27. The method of claim 26 further comprising, before the step of sending said data for transmission, the step of binding said cable modem driver to a wide area network protocol driver.

28. The method of claim 26 further comprising, before the step of sending said data for transmission, the step of binding said PSTN-connected modem driver to a wide area network protocol driver.

* * * * *